United States Patent [19]
Arciprete et al.

[11] 3,824,551
[45] July 16, 1974

[54] RELEASABLE BUFFER MEMORY FOR DATA PROCESSOR

[75] Inventors: Genio R. Arciprete, Lexington; Peter G. Martin, Arlington, both of Mass.

[73] Assignee: Arthur D. Little Inc., Cambridge, Mass.

[22] Filed: May 18, 1972

[21] Appl. No.: 254,711

[52] U.S. Cl. .............................................. 340/172.5
[51] Int. Cl. .............................................. G06f 11/00
[58] Field of Search .................................. 340/172.5

[56] References Cited

UNITED STATES PATENTS

| | | | |
|---|---|---|---|
| 3,400,376 | 9/1968 | McDonnell | 340/172.5 |
| 3,581,291 | 5/1971 | Iwamoto et al. | 340/172.5 |
| 3,588,833 | 6/1971 | Bartlett et al. | 340/172.5 |
| 3,611,315 | 10/1971 | Murano et al. | 340/172.5 |
| 3,641,508 | 2/1972 | Saltini | 340/172.5 |
| 3,662,348 | 5/1972 | Weiss | 340/172.5 |
| 3,676,846 | 7/1972 | Busch | 340/172.5 X |
| 3,683,418 | 8/1972 | Martin | 444/1 |
| 3,703,949 | 11/1972 | Howard et al. | 340/172.5 X |
| 3,735,360 | 5/1973 | Andersen et al. | 340/172.5 |

*Primary Examiner*—Paul J. Henon
*Assistant Examiner*—Mark Edward Nusbaum
*Attorney, Agent, or Firm*—Schiller & Pandiscio

[57] ABSTRACT

The invention is a buffer memory release system for an automatic data processor which incorporates a buffer memory interposed between an input/output device, e.g., a typewriter, and a mass data storage means, with the buffer memory and the mass storage means each adapted to store data blocks made up of a plurality of characters of which usually less than all are meaningful, i.e., data-bearing, characters. The meaningful characters are those characters (including spaces) that correspond to a typewritten line. The remaining characters of the data block correspond to blank or unused cells in the buffer memory and are considered to be blank or unused characters. The preferred embodiment of the invention is designed so that in the writing (i.e., recording) mode, the meaningful characters of a data block are emptied from the buffer memory into the mass storage means, followed by the writing of zeros representative of the blank cells (unused characters) in the buffer, and means are provided for making the buffer memory available for input of new data from the typewriter as soon as the writing of zeros commences. In the reading (i.e., playing-out) mode, means are provided for printing out characters from a block of data immediately after all of the meaningful characters in that data block have been transferred into the buffer memory from the mass storage means and without waiting until the recorded zeros that follow the meaningful characters are read out. This releasing of the buffer avoids delays in mechanical operations.

23 Claims, 3 Drawing Figures

Figure 2:
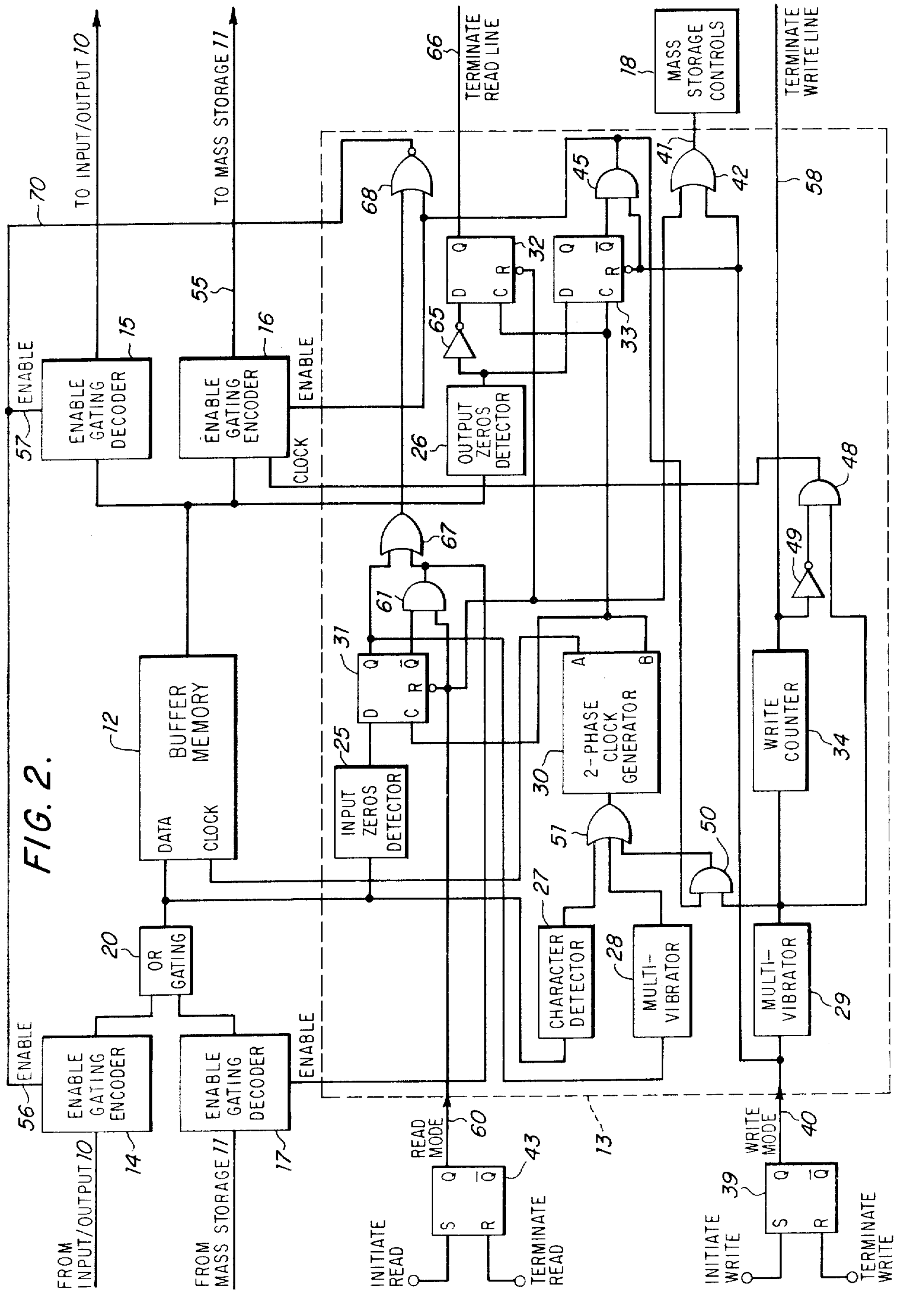

*Numbers correspond to component reference numerals in Fig. 2.

RELEASABLE BUFFER MEMORY FOR DATA PROCESSOR

This invention relates to data processing equipment suitable for transferring data between some form of permanent mass storage means and an input/output device such as a printer. The invention relates more particularly to such data processing equipment which incorporates a buffer memory and mass storage means where data are recorded and stored in fixed-length blocks of many characters or bytes, each formed of a plurality of bits, and where a block may contain a number of unused characters. Thus, a block may contain a number of characters constituting the useful data, and a number of blank characters represented as zeros.

The data for the apparatus of this invention may be provided in the form of suitable signals from a printer (such as that disclosed in U.S. Pat. No. 2,919,002), from a computer, from switches on a control panel, and the like. The mass storage means are typically those wherein data are recorded in fixed-length blocks of many characters or bytes and are represented by such wellknown devices as magnetic tape, magnetic cards, disc or drum storage means, delay line memories, and the like.

Although it is sometimes possible to transfer the data signals in appropriate form directly from the input/output device to the mass storage means, it is often preferable to include a buffer memory in the data transfer and storage system so that the input/output device and mass storage means can operate independently, and also so that a block of data can be edited or otherwise modified.

As an example of this, in a word processor including a keyboard operated printer (e.g., a typewriter) adapted to generate coded character and function signals and a mass data storage means (e.g., magnetic tape), each fixed-length block might contain one typewritten line. The fixed-length data block may, however, be longer than the normal typewritten line to allow for the inserting of additional material or otherwise editing of a line and then reentering it in the same mass storage means location. A word processor incorporating a temporary buffer memory system has been developed and is described in copending application Ser. No. 254,727 filed concurrently herewith and assigned to the same assignee as the present invention. This buffer memory system is interposed between the data signal source and the mass storage means and is adapted to transfer the signals, after appropriate processing, into the mass storage system during what may be called the writing mode of operation. It is likewise adapted to receive signals from the mass storage system, during what may be called the reading mode of operation, and to transfer them to a signal responsive mechanism during what may be called a printing mode of operation.

In the data processing apparatus described in the above identified U.S. Patent application, the buffer memory and its associated mass storage means are each arranged to provide fixed-length data blocks which are several times longer than the meaningful contents normally contemplated to be stored in any one block. For example, the average typewritten line contains some 60 characters including spaces. By incorporating a temporary buffer memory and a permanent mass storage system into such a word processor wherein a block is, for example, equivalent in length to 200 characters, there is provided the capability of adding the equivalent of about 140 characters into the block of this example. It will, of course, be appreciated that any appropriate data block length may be chosen for the particular data processing system in which the buffer/mass storage system is used. Although the use of the buffer memory interposed between the data source and the mass storage means has functions and advantages over and above providing means for adding characters to a line, it is not necessary to discuss these functions since they are not part of the present invention.

Using the above example, it will be apparent that a data block containing an average typewritten line will also contain a large number of blank or empty cells in addition to the cells occupied by characters stored therein. In the above mentioned writing mode of operation, the meaningful characters will be emptied from the buffer memory into the mass storage means, followed by the writing of zeros into the mass storage means, which zeros here correspond to the unused character positions in the buffer. In some situations the writing process for the entire buffer memory contents requires about the same amount of time needed for the data source mechanism or data printing mechanism to perform some mechanical function. For example, in the word processor described in the aforesaid copending patent application, the writing process for the entire contents of a 200-character buffer memory requires about the same amount of time needed for the print head on a printer to return from a typical right-hand margin position to a typical left-hand margin position. However, if the time required to perform that mechanical function is materially shortened such as, for example, when a print head must return from a position close to the left-hand margin position, then it would be necessary to momentarily prevent the entry of further typed data into the buffer memory until the entire buffer memory contents including the zeros could be emptied into the mass storage means. If, however, means are provided to make the buffer memory available for input of new data during writing of the zeros (i.e., immediately after the meaningful data have been transferred out), then delays in subsequent mechanical operations can be avoided. The buffer memory release mechanism of this invention provides such means.

Similar considerations apply when reading characters from the mass storage means into the buffer memory and causing said characters to be printed by the input/output device. It is desirable that means be provided to permit the printing of characters from a block of data during reading immediately after the meaningful data have been transferred into the buffer memory, so that no delays are encountered in subsequent mechanical operations. The buffer memory release mechanism of this invention also provides this means.

It is therefore a primary object of this invention to provide a buffer memory release system suitable for use in data processing equipment which incorporates a buffer memory means interposed between data source means and mass data storage means. It is another object to provide a buffer memory release system of the character described which releases the buffer memory for further entry therein or output therefrom immediately following transfer of meaningful characters between the mass storage means and the buffer memory means. It is yet a further object of this invention to provide a buffer memory release system which is particularly suited for use in a word processing device wherein the buffer memory and the mass storage means incorporate data blocks of lengths greater than that normally required, thus providing the capability of adding data to a block. Other objects of the invention will in part be obvious and will in part be apparent hereinafter.

The invention accordingly comprises the features of construction, combination of elements and arrangements of parts which will be exemplified in the constructions hereinafter set forth, and the scope of the invention will be indicated in the claims.

In the data processing apparatus to which the buffer memory release system of the present invention is applicable, data are transferred from the buffer memory to the mass storage means in the writing mode, each character being multiplexed and encoded if appropriate. After each character is recorded in the mass storage means, the buffer memory is adjusted by clocking or other means so that the next character is available for writing, and a blank cell detector coupled to the buffer memory output is used to determine if an unused character is about to be recorded. If this is the case, means, such as a Write Zero flip-flop, are provided to cause zeros to be written in the mass storage means automatically. As a result the useful data are transferred from the buffer memory to the mass storage means and then the zeros corresponding to the unused cells are automatically transferred to the storage means without reference to the buffer memory. This means that the buffer memory becomes immediately available for data entry into the next data block, as soon as the Write Zero flip-flop begins to write zeros into the mass storage means.

In a similar manner during the reading mode of operation, each meaningful character is read into the buffer memory, after decoding and demultiplexing if appropriate, until a blank cell is reached indicating that all the desired meaningful data have been transferred to the buffer memory. A Read Zero flip-flop, arranged to be set if a blank cell is detected at the input of the buffer memory, initiates a very rapid shifting of the buffer memory so that the first data character read from the mass storage means is made to appear at the buffer output. If the machine receiving data signals from the buffer memory is in a continuous printing mode, printing is stopped while the useful data of each record are being read from the mass storage means to the buffer memory; but the printing is automatically reinitiated as soon as this rapid shift is completed. As a result, only the useful data are read, while the recorded zeros which follow are not read and the useful contents of the buffer memory are made available for further processing, e.g., printing.

In brief, the buffer memory release system of this invention used in conjunction with the buffer memory interposed between a data signal source and a mass storage means, which stores data in fixed-length blocks of many characters not all of which need be useful data, comprises means for transferring the fixed-length blocks between the mass storage means and the buffer memory and means for releasing the buffer memory for subsequent data entry or output as soon as the useful data have been transferred from the buffer memory to the mass storage means or as soon as the useful data have been transferred from the mass storage means to the buffer memory.

Although, as noted above, the buffer release mechanism of this invention is applicable to data processing equipment incorporating a buffer memory associated with a mass storage means capable of storing data in fixed-length blocks, the invention will for convenience be described in terms of a word processor, and more particularly in terms of a word processor in which the input/output device is an electronically-controlled typewriter such as the type described in U.S. Pat. No. 2,919,002 and in which the mass storage means comprises magnetic tape.

Figure 1:
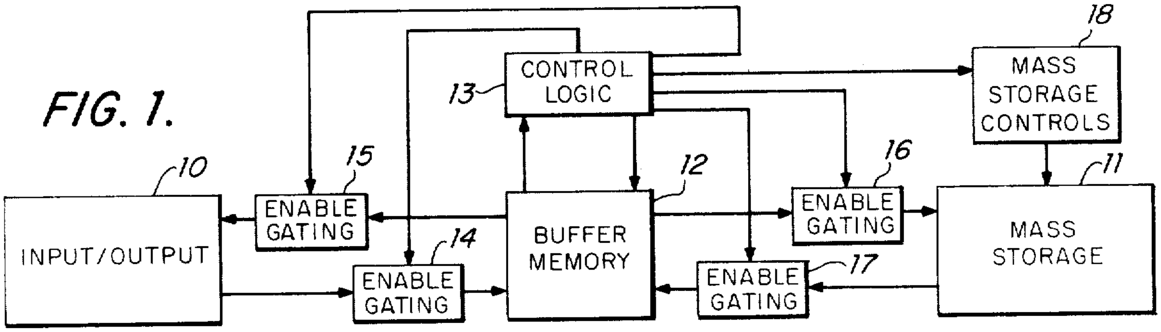
Figure 3:
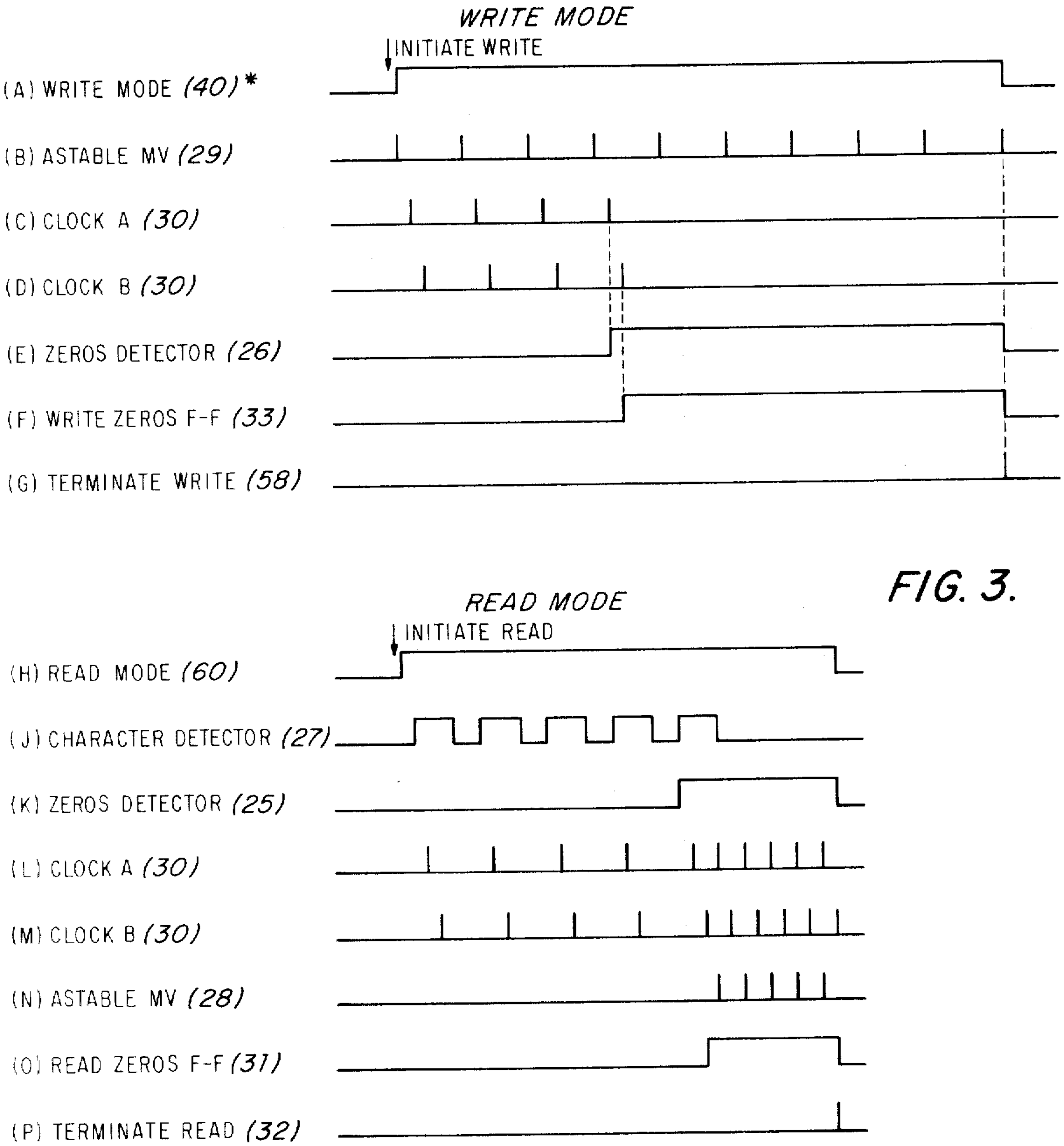

For a fuller understanding of the nature and objects of the invention, reference should be had to the following detailed description taken in connection with the accompanying drawings in which FIG. 1 is a simplified block diagram illustrating an exemplary data processing system incorporating the buffer release mechanism of this invention;

FIG. 2 is a detailed circuit diagram for the control logic of the buffer release mechanism of this invention; and FIG. 3 illustrates the timing diagrams for selected components for the Write Mode and Read Mode of operation.

In this invention, the data comprise multi-bit characters and a data block is to be understood as a group of characters, some of which are meaningful or data-bearing and the rest of which are non-meaningful. A non-meaningful character is herein characterized as a blank character and the term "blank cell" is used to designate a cell, i.e., character storage location, in the buffer memory which contains a blank character. More specifically, a blank cell is one which does not store a data-bearing character, i.e., is unused, and thus a blank character may also be construed as an unused character since it is not a meaningful or data-bearing character. For convenience, a blank character is advantageously encoded as a sequence of identical bits, for example all zeros. Clearly, however, the use of zeros to encode blank characters is merely exemplary and other codes could be used instead.

FIG. 1 illustrates, in simplified form, the overall relationship of selected components making up a word processor such as is described in the aforesaid copending patent application. For purposes of this illustration the input/output device 10 (hereinafter referred to as a typewriter) is connected in signal-responsive relationship to a mass storage means 11 (hereinafter referred to as a magnetic tape) through a buffer memory 12 which is under the influence of control logic 13 (the latter is detailed in FIG. 2 within the dotted lines). Control logic 13, in turn, is connected to and controls transfer means such as enable gating 14 adapted to encode signals transferred from the typewriter 10 to buffer memory 12, transfer means such as enable gating 15 adapted to decode signals transferred from the buffer memory to the typewriter, means such as enable gating 16 adapted to encode signals transferred from buffer memory 12 to the magnetic tape 11, and means such as enable gating 17 adapted to decode signals transferred from the magnetic tape 11 to buffer memory 12. Another function of control logic 13 is the operation of magnetic tape control system 18 which typically includes an appropriate motor drive, magnetic and time control means, etc., all as well known in the art. Details of ememplary enable gating 14, 15, 16 and 17 are shown in FIGS. 4 and 5 and the text descriptive thereof in the aforesaid U.S. Pat. application No. 254,727. Similarly a description of an exemplary magnetic tape control system is given in FIG. 11 and the text descriptive thereof in aforesaid U.S. Pat. application No. 254,727.

It will be apparent to those skilled in the art that certain of the single lines shown in FIGS. 1 and 2 connecting the typewriter, buffer memory, magnetic tape and gatings are in fact or may be multiple lines, and that the single lines are used for simplicity and clarification of the drawing.

FIG. 2, in which like components are identified by the same reference numerals used in FIG. 1, illustrates in detail the circuitry and operation of control logic 13 which is used to release the buffer memory in both the Write and Read modes. In the circuitry shown in FIG. 2 enable gatings 14, 15, 16 and 17 act as gates to enable or inhibit the flow of data from one point to another, and in addition, perform the function of an encoder or decoder, as the case may be. An important feature of the control logic for the buffer release is to enable alternatively gating 14 or 15 (from and to an input/output device respectively) whenever possible, and to interrupt this only to enable gating 16 or 17 (to and from the mass storage means) when information other than that arising from stored zeros is being written into or read from the magnetic tape.

The encoder function of gating 14 is to convert the format of signals received from the input/output device to a format suitable for entry into the buffer memory, while the encoder function of gating 16 is to convert the signals at the output of the buffer memory to a format suitable for entry into the mass storage means. The decoder function of gating 15 is to convert the signals at the output of the buffer memory into a format suitable for application to the input/output device, while the decoder function of gating 17 is to convert the signals retrieved from the mass storage means into a format suitable for entry into the buffer memory. Thus, by way of example, gating 16 may be adapted to phase encode the output from the buffer so as to facilitate writing on magnetic tape. The gatings may also include multiplexing or demultiplexing in conjunction with the aforesaid encoding and decoding functions respectively. Thus further by way of example, if the buffer memory is adapted to store characters as multi-bit parallel codes and the mass storage means is adapted to store characters as multi-bit serial codes, gating 16 will comprise a parallel-to-series encoder and gating 17 will comprise a series-to-parallel decoder. On the other hand, if the mass storage means is adapted to store characters as parallel codes, e.g., if the mass storage means is a multi-track magnetic tape, the encoding function of gating 16 may be merely to phase encode the output signals from the buffer and the decoding function of gating 17 may be to phase decode the signals retrieved from the mass storage means. The foregoing and still other encoding and decoding modes, with and without multiplexing and demultiplexing requirements, are well known to persons skilled in the art.

Buffer memory 12 is a limited capacity storage device used to store data signals being transferred from the typewriter to the magnetic tape and from the magnetic tape to the typewriter. In the following description the buffer memory 12 is assumed to be a shift register; but it will be appreciated that it may be of some other form, such as a random access memory with a suitable address register, or a delay line. A primary characteristic of the buffer memory, as well as of the mass storage means, is that it is capable of storing data in fixed length blocks. In order to give the word processor the capability of adding data to a line, the fixed-length data block of the buffer memory and of the magnetic tape is set at a number which exceeds the usual number of data-bearing characters in a given typewritten line. For example, the data block may be set at 200 characters whereas a normal typewritten line normally contains about 60. The remaining 140 blank characters are merely redundant until they are used later when data are added to a block.

Because the electronic information being transferred from the typewriter to the buffer memory during the data entry is asynchronous, that is, it appears at irregular intervals for varying lengths of time and because it requires a relatively long time to transmit information from buffer memory 12 to typewriter 10 during the Print Mode, the typewriter enable line 70 should remain high for the maximum possible time. Because of this, the buffer release control logic of this invention has the capability of determining when non-meaningful data are being transferred in either direction between the buffer memory and the magnetic tape. When this condition is determined, the buffer is in effect "released" from the mass storage means making it possible to transmit data signals between the buffer memory and typewriter.

The buffer memory release control logic has two modes of operation depending upon whether the word processor is operating in the Write Mode or Read Mode. Each of these modes of operation is explained hereinafter.

As shown in FIG. 2, the control logic 13 comprises a buffer input blank cell (zeros) detector 25, buffer output blank cell (zeros) detector 26, buffer input character detector 27, a high-frequency astable multivibrator 28 serving as a rapid-shift clock in the Read Mode, an astable multivibrator 29 serving as a Write clock, a two-phase clock generator 30 generating what will be termed "Clock A" pulses and "Clock B" pulses which always follow Clock A pulses, a Read Zero D-type flip-flop 31, a Read Terminate D-type flip-flop 32, a Write Zero D-type flip-flop 33 and a Write counter 34.

The outputs of gatings 14 and 17 are applied to separate input terminals of an OR gate 20 whose output is coupled as an input to buffer memory 12. The output of OR gate 20 also is applied as an input to blank cell detector 25 and as an input to character detector 27. The output of detector 25 is applied to the D terminal of flip-flop 31. The Q terminal of flip-flop 31 is connected to one input terminal of an OR gate 67 which has a second input connected to the output of an AND gate 61. The latter's output also is applied as an enable input to gating 17. The $\overline{Q}$ terminal of flip-flop 31 is connected to one input terminal of AND gate 61. The reset terminal of flip-flop 31 and a second input terminal of gate 61 are connected to a Read Mode line 60 which is coupled to the Q terminal of an RS type Read Mode flip-flop 43. An Initiate Read signal is applied to the S terminal of flip-flop 43 when it is desired to read out recorded data, and a Terminate Read signal is applied to the R terminal of the same flip-flop to terminate operation in the Read Mode. The Read Mode line 60 also is coupled to the reset terminal of Read Terminate flip-flop 32.

The Q terminal of flip-flop 31 is connected to the enable input of multivibrator 28. The enable input of multivibrator 29 is connected to a Write Mode line 40 which is connected to the Q terminal of an RS-type Write Mode flip-flop 39. An Initiate Write signal is applied to the S terminal of flip-flop 39 when it is desired to record data, and a Terminate Write signal is applied to the R terminal of the same flip-flop to terminate operation in the Write Mode.

The output of multivibrator 29 is connected as an input to an AND gate 50 and also as an input to Write Counter 34. The output of the latter is connected to a Terminate Write line 58 (which is connected to the R terminal of flip-flop 39) and also to the input of an inverter 49. The output of inverter 49 serves as one input to an AND gate 48. The output of multivibrator 29 is coupled as a second input to AND gate 48. The latter's output terminal is coupled to a clock terminal of enable gating 16.

An OR gate 51 has separate inputs from detector 27, multivibrator 28, and AND gate 50. The output of OR gate 51 serves as the trigger input to clock generator 30. The Clock A output of generator 30 is coupled to the clock terminal of buffer memory 12, while its Clock B output is coupled to the C or clock terminal of flip-flops 31, 32 and 33.

The output of buffer memory 12 is coupled to the input side of detector 26. The latter's output is coupled directly to the D terminal of flip-flop 33 and also by way of an inverter 65 to the D terminal of flip-flop 32. The Q terminal of flip-flop 32 is connected to a Terminate Read line 66 which is connected to the R terminal of flip-flop 43.

The Write Mode line 40 is also connected to the reset terminal of flip-flop 33 and to one of the input terminals of an OR gate 42. The latter has a second input terminal which is connected to Read Mode line 60. The output of OR gate 42 is applied via a line 41 as the input to the magnetic tape controls 18.

The $\overline{Q}$ terminal of flip-flop 33 is connected to one of the input terminals of an AND gate 45. Write Mode line 40 is connected to a second input terminal of AND gate 45. The latter's output is applied as a second input to AND gate 50, as one of the inputs to a NOR gate 68; and also as an enable signal for gating 16. The output terminal of OR gate 67 is connected to a second input terminal of NOR gate 68. The latter's output is coupled via enable line 70 to lines 56 and 57 that are coupled to the enable terminals of gatings 14 and 15.

The operation of the buffer memory release may best be described in terms of an example. Therefore, for exemplary purposes only, it will be assumed that each data block contains 10 characters -- far less than normal but more convenient to handle in an example. There is, of course, nothing critical about the actual length of the data block. In this example, it will also be assumed that the data block contains 4 meaningful or data-bearing characters and 6 blank characters.

The Write Mode is initiated by applying to the S terminal of RS Write Mode flip-flop 39 an Initiate Write signal that causes Write Mode line 40 to go high (timing line A of FIG. 3). As a result, magnetic tape control line 41 goes high, Write Zeros flip-flop 33 is enable by releasing the reset input at its inverting reset terminal R, and astable multivibrator 29 is gated on (timing line B of FIG. 3). As a result of this established condition both inputs of AND gate 45 are high. Thus the output of gate 45 goes high and enables the gating 16 so that any signals on the output lines from buffer memory 12 are encoded by means of enable gating 16 into the output lines 55 which transmit data to magnetic tape 11. When the output of gate 45 goes high, the enable line 70 goes low, with the result that enable gatings 14 and 15 are disabled and the buffer memory is effectively released from the typewriter. However, since line 40 is high, line 41 also is high and thus the mass storage controls 18 are activated to permit data to be recorded on tape 11.

The signals from multivibrator 29 increment the counter 34. The counter is adapted so that its output is normally low but will go high and then will automatically reset itself when it has counted to the character capacity of a data block, e.g., when it has counted to 10. Hence Terminate Write line 58 will stay low until the counter's output goes high. Since the output line of counter 34 is connected to one input terminal of AND gate 48 by way of inverter 49, and since the output of multivibrator 29 is connected to the other input terminal of gate 48, the output of that gate will go high with each pulse from multivibrator 29 so long as the output line of counter 34 is low. Hence gate 48 will provide clock pulses to gating 16 at the frequency of multivibrator 29 until the counter's output goes high.

Since the output of gate 45 is high, the output of gate 50 will go high with each pulse from multivibrator 29, with the result that the two-phase clock generator 30 will generate Clock A pulses and Clock B pulses at the frequency of multivibrator 29. The Clock B pulses follow the Clock A pulses as shown in timing lines C and D of FIG. 3. The Clock A pulses clock the buffer memory and the Clock B pulses clock flip-flops 31, 32 and 33.

Assume that a data block is being transferred from buffer memory 12 to tape 11. Each clock pulse received by the buffer memory will step the buffer memory one character. Hence the first Clock A pulse will cause the next character to appear at the output of the buffer memory. If the character is a useful one, i.e., is not a blank character, it will be presented to the magnetic tape via enable gating 16 and Write counter 34 will be incremented at the same time by the output of multivibrator 29. One Clock A and one Clock B pulse will follow in that order. On every B clock time, Write Zero flip-flop 33 looks for a blank character at the output of buffer memory 12. If no blank character is detected by detector 26, the D terminal of flip-flop 33 will stay low, with the result that its $\overline{Q}$ terminal will stay high and the output of gate 45 will stay high.

After a useful character has been transferred to the magnetic tape in the manner described, the contents of buffer memory 12 are shifted within the buffer memory so that the next character appears at its output. So long as no blank cell is detected by detector 26 at the buffer memory's output at Clock B time, data will be continued to be written in the magnetic tape. Thus in the example used herein this procedure is repeated for three Clock B times as shown in timing line E of FIG. 3 which traces the condition prevailing at the input of buffer output blank cell detector 26. Then, in this example, the fourth pulse of Clock A shifts the fourth and last useful character out of the buffer memory and a blank character arrives at the buffer memory output; i.e., the last cell in the buffer memory is blank. The presence of this first blank cell causes the output of buffer output blank cell detector 26 to go high (see timing line E of FIG. 3). The fourth Clock B pulse, which follows immediately after blank cell tetection, then causes Write Zeros flip-flop 33 to be set, which in effect makes the $\overline{Q}$ terminal of flip-flop 33 go low. Since the $\overline{Q}$ terminal of flip-flop 33 is connected through AND gate 45 to enable gating 16, this condition in flip-flop 33 causes the output of gate 45 to go low to disable enable gating 16. At the same time the low output of gate 45, applied to NOR gate 68, causes the enable line 70 to go high, thus enabling gatings 14 and 15 via lines 56 and 57. The buffer memory is therefore "released" from the magnetic tape and is available to receive signals again from the typewriter.

The buffer memory now contains only blank characters (6 in this example) formed of zeros. However, since gating 16 is disabled, it will not respond to the blank characters appearing at its input. The output lines of gating 16 will all stay low so long as it is disabled. Hence, since the control logic is still in the Write mode, pulses from the astable multivibrator Write clock 29 continue to be generated as shown in timing line B of FIG. 3 and the data lines 55 to the magnetic tape provide only zeros (blank characters) so long as the output of gate 45 is held low. Thus effectively the six blank characters in the buffer memory are written into the tape but without using the buffer memory input to gating 16. After the sixth blank character is written in the magnetic tape, the Write counter 34 reaches its overflow state and drives the Write Terminate line 58 high. This in turn causes Write mode flip-flop 39 to change state, with the result that line 40 goes low to bring about a complete termination of the Write mode as shown in timing lines A and G of FIG. 3. With this termination of the Write mode, all signals to the magnetic tape cease since the multivibrator 29 and clock generator 30 are rendered inoperative so that the gating 16 is no longer clocked.

The same example may be used to read back four meaningful characters and six blank characters, in which case the buffer memory is "released" just after the first blank character is read from the magnetic tape.

The Read Mode is initiated by applying to the S terminal of an RS Read mode flip-flop 43 an Initiate Read signal that causes Read Mode line 60 to go high (see also timing line H of FIG. 3). When line 60 goes high, Read Zeros flip-flop 31 and Read Terminate flip-flop 32 are enabled. The signal in line 60 also causes magnetic tape drive line 41 to go high, the signal on line 60 being transmitted to line 41 through OR gate 42. Simultaneously, enable gating 17 is enabled by flip-flop 31 via AND gate 61 and this makes it possible for the decoding of signals from the magnetic tape to proceed through OR gate 20 to the buffer memory input. The presence of each character at the input to buffer memory 12 is detected by buffer input character detector 27. The latter's output line goes high when a character (either a data-bearing or a blank character) is detected (see timing line J of FIG. 3). The output of detector 27 is coupled via OR gate 51 to clock generator 30 and causes the generation of one Clock A and one Clock B pulse for each detected character (timing lines L and M of FIG. 3). The Clock A pulses strobe the data characters into the buffer memory.

On each of the Clock B pulse times, Read Zero flip-flop 31 operates via detector 25 to examine the character at the buffer input to determine whether or not it is a blank character. Thus, in this example, since the first four characters represent useful data, the output of detector 25 will remain low (see timing line K of FIG. 3) and Read Zero flip-flop 31 will remain reset. However, the fifth character will be detected as a blank character by detector 25. Hence the latter's output will go high and at the Clock B time associated with this fifth character, the Read Zero flip-flop 31 will be set and its $\overline{Q}$ terminal will go low. This in turn causes the output of gate 61 to go low so as to disable gating 17. At this point, the enable signals gatings 14, 15 and 16 also are low. The enables to gatings 14 and 15 are low because the Q terminal of flip-flop 31 is high, thus causing line 70 to be low; and the enable to gating 16 (the output of gate 45) is low because the Write Mode line 40 is low. Hence no information can appear at the input to the buffer memory, and no information is communicated to either the typewriter or the magnetic tape from the buffer memory. The Q output of flip-flop 31 being high (timing line O of FIG. 3), high-frequency astable multivibrator 28 is enabled to generate a high-frequency pulse train (timing line N of FIG. 3), each pulse of which is applied via gate 51 to cause generator 30 to generate a Clock A and a Clock B pulse. It is to be noted that the output of multivibrator 28 has a substantially higher frequency than that of multivibrator 29. Hence the Clock A pulses cause the buffer memory to undergo a rapid shifting of data which puts the blank characters into the buffer memory and moves the four useful information characters to the output of the buffer memory.

When the first informational character has been shifted to the output end of the buffer memory, the output of buffer output blank cell detector 26 goes low, causing the output of inverter 65 to go high for the first time after the control logic was put in the Read mode. This sets Read Terminate flip-flop 32 at the next Clock B time and the Read Terminate output 66 goes high (timing line P of FIG. 3). Since line 66 is connected to the R terminal of Read Mode flip-flop 43, a high signal thereon will cause flip-flop 43 to change state so that line 60 goes low. This in turn resets the control logic out of the Read Mode, and the magnetic tape drive line 41 will go low. Read Zero flip-flop 31 and Read Terminate flip-flop 32 are reset by virtue of Read Mode line 60 going low. Finally, the typewriter enable line 70, connected through OR gate 67 and NOR gate 68 to the Q terminal of flip-flop 31, goes high (because the Q terminal of flip-flop 31 and the output terminal of AND gate 45 are both low), and thus the operation in the Read Mode is terminated. Under some circumstances it may be desirable to continue the magnetic tape drive until the end of the data block is reached.

The buffer memory release apparatus of this invention permits optimal use of a buffer memory and mass storage means, wherein data are stored in blocks in which a large portion of many of the block contains blank cells, in a data processing system. Exemplary of the advantages to be realized from this buffer memory release is the ability to provide extensive data addition capability to a word processor without having to place any limitations upon the operation of the input/output component.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

What is claimed is:

1. Data processing apparatus comprising:
   a buffer memory having a capacity for storing at least one block of multi-bit characters, each such block being organized as a sequence of data-bearing characters followed by at least one blank character;
   a first system for supplying data-bearing characters to and receiving data-bearing characters from said buffer memory;
   a second system for supplying data-bearing characters to and receiving data-bearing characters from said buffer memory;
   first gating means for controlling transfer of data-bearing characters between said first system and said buffer memory;
   second gating means for controlling transfer of characters between said second system and said buffer memory, such that data-bearing characters are transferred as a sequence in a block;
   means for detecting the occurrence of a blank character in a block of multi-bit characters being transferred; and
   control means, responsive to said means for detecting, for disabling one of said gating means while data-bearing characters are being transferred by the other gating means and then for enabling said one gating means and disabling said other gating means immediately after completion of transfer of a sequence of said data-bearing characters as indicated by detection of said blank character by said means for detecting.

2. Data processing apparatus according to claim 1 wherein said control means comprises means for disabling said first gating means while a sequence of data-bearing characters within a given block are being transferred between said buffer memory means and said second system and for then enabling said first gating means immediately after detection of a blank character in said given block indicates that said sequence of data-bearing characters in said given block have been transferred between said buffer memory means and said second system.

3. Data processing apparatus according to claim 1 wherein said control means comprises means for disabling said second gating means while data-bearing characters of a given block are being transferred between said buffer memory and said first system and for then enabling said second gating means immediately after detection of a blank character in said given block indicates that all of the data-bearing characters in said given block have been transferred between said buffer memory and said first system.

4. Data processing apparatus according to claim 1 wherein said first system is an input/output device.

5. Data processing apparatus according to claim 4 wherein said first system comprises a typewriter.

6. Data processing apparatus according to claim 1 wherein said second system is a mass storage means.

7. Data processing apparatus according to claim 6 wherein said mass storage means comprises magnetic tape and means for recording characters on and reading characters from said tape.

8. Data processing apparatus according to claim 1 wherein said buffer memory is a shift register.

9. Data processing apparatus according to claim 1 wherein said first system is an input/output printer, said second system is a mass storage means, and said buffer memory is a shift register.

10. Data processing apparatus according to claim 1 wherein said blank characters are characters having all bits identical.

11. Data processing apparatus comprising in combination:
   input/output means capable of transmitting and receiving data;
   a buffer memory capable of temporarily storing data blocks each consisting of a fixed number of multi-bit characters organized as a sequence of data-bearing characters followed by at least one blank character;
   mass storage means capable of storing data blocks transferred thereto from said buffer memory means;
   first gating means for transferring data-bearing characters from said input/output means to said buffer memory;
   second gating means for transferring data-bearing characters from said buffer memory to said mass storage means;
   first means for detecting the occurrence of a blank character in a block of said multi-bit characters being transferred; and
   control means responsive to said means for detecting and comprising means for disabling said first gating means while data-bearing characters of a given data block are being transferred from said buffer memory to said mass storage means and for then enabling said first gating means and disabling said second gating means upon detection of a blank character in said given data block, which detection indicates that all of the data-bearing characters in said given block have been transferred from said buffer memory to said mass storage means.

12. Data processing apparatus according to claim 11 wherein said control means further includes means for disabling said second gating means after the blank characters in said given data block have been transferred from said buffer memory to said mass storage means.

13. Data processing apparatus according to claim 12 further including means for counting the number of characters transferred from said buffer memory to said mass storage means, and means responsive to said counter for operating said means for disabling said second gating means when the number of characters transferred to said mass storage means by said second gating means is equal to said fixed number.

14. Data processing apparatus according to claim 11 further including:
   third gating means for transferring data-bearing characters from said mass storage means to said buffer memory;
   fourth gating means for transferring data-bearing characters from said buffer memory to said input/output means; and further wherein:

said control means comprises means for disabling said fourth gating means while data-bearing characters of a given data block stored in said mass storage means are being transferred to said buffer memory and for enabling said fourth gating means so that another data block can start being transferred from said buffer memory to said input/output means immediately after all of the data-bearing characters in said given data block have been transferred to said buffer memory from said mass storage means.

15. Data processing apparatus according to claim 14 wherein said first means for detecting is disposed for detecting blank characters at the output of said buffer memory, and said control means includes a second character detector means for detecting characters at the input to said buffer memory, and said means for enabling and disabling said fourth gating means is responsive to said second character detecting means.

16. Data processing apparatus comprising in combination:

a. input/out means capable of transmitting and receiving data;

b. a buffer memory capable of temporarily storing data blocks each consisting of a plurality of multi-bit characters organized as a sequence of data characters followed by at least one blank character;

c. mass storage means capable of storing data blocks transmitted thereto from said buffer memory;

d. means for transferring data characters between said input/output means and said buffer memory;

e. means for transferring data blocks between said buffer memory and said mass storage means;

f. means for detecting said blank character in a sequence of said multi-bit characters being transferred; and g. buffer release means including means, responsive to said means for detecting, for enabling said buffer memory to receive data characters from said input-/output means immediately after the data characters in a given block stored in said buffer memory have been transferred to said mass storage means, as indicated by detection of a blank character in said given block.

17. Data processing apparatus according to claim 16 wherein said buffer release means comprises means for permitting transfer of data characters from said input-/output means to said buffer memory only when one of the following conditions exists:

a. the buffer memory contains less than a full data block and b. all of the data characters in said given data block have been transferred to said mass storage means.

18. Data processing apparatus comprising in combination;

input/output means capable of transmitting and receiving data;

a buffer memory capable of temporarily storing data blocks consisting of a fixed number of characters organized as a sequence of data-bearing characters followed by at least one blank character;

mass storage means capable of storing said data blocks;

means for transferring data-bearing characters between said input/output means and said buffer memory;

means for transferring said data blocks between said buffer memory and said mass storage means; and control means for preventing transfer of data-bearing characters to said buffer memory from one of said input/output means and said mass storage means so long as data-bearing characters of a given data block stored in said buffer memory are being transferred from said buffer memory to the other of said input/output means and said mass storage means, said control means also including detecting means for detecting when all of the data-bearing characters of said given data block have been transferred out of said buffer memory, and means responsive to said detecting means for conditioning said control means so as to allow immediate start of transfer of data-bearing characters of another data block to said buffer memory when said detecting means has sensed that all of the data bearing characters in said given data block have been transferred out of said buffer memory.

19. Data processing apparatus according to claim 18 wherein said detecting means is a blank character detector connected to the output of said buffer memory.

20. Data processing apparatus according to claim 18 wherein said detecting means is a blank character detector connected to the input of said buffer memory.

21. Data processing apparatus according to claim 18 wherein said buffer memory is a shift register, and further wherein said control means comprises means for rapidly shifting said register to simulate transfer of blank characters to said register from said mass storage means.

22. Data processing apparatus according to claim 18 further including means for generating blank codes independently of blank characters stored in said buffer memory and for transferring said independently generated blank characters to said mass storage means.

23. Data processing apparatus comprising in combination:

a. input/output means capable of transmitting and receiving data;

b. a shift register buffer memory capable of temporarily storing data blocks each consisting of a plurality of multi-bit characters organized as a sequence of data characters followed by at least one blank character;

c. mass storage means capable of storing data blocks transmitted thereto from said buffer memory;

d. means for transferring data characters between said input/output means and said buffer memory;

e. means for clocking shifting of said register at a first relatively slow fixed shift time rate or at a second relatively fast fixed shift time rate;

e. means for transferring data blocks between said buffer memory and said mass storage means at said first shift rate; and g. buffer release means including means operative immediately after the data characters in a given block stored in said mass storage means have been transferred at said first shift rate to said buffer memory, for shifting said data characters in said given block through said memory at said second shift rate.

* * * * *

UNITED STATES PATENT OFFICE
CERTIFICATE OF CORRECTION

Patent No. 3,824,551 Dated July 16, 1974

Inventor(s) Genio R. Arciprete, Peter G. Martin

It is certified that error appears in the above-identified patent and that said Letters Patent are hereby corrected as shown below:

Claim 16, column13, line 22, "input/out" should be corrected to read --input/output--;

Claim 23, column 14, line 57 "e" should be corrected to read --f--.

Signed and sealed this 15th day of October 1974.

(SEAL)
Attest:

McCOY M. GIBSON JR.
Attesting Officer

C. MARSHALL DANN
Commissioner of Patents